United States Patent
Takimoto (10) Patent No.: US 6,955,238 B2
(45) Date of Patent: Oct. 18, 2005

(54) EXTERNALLY-DEVELOPED AIRBAG DEVICE

(75) Inventor: Takayuki Takimoto, Shiga (JP)

(73) Assignee: Takata Corporation, Tokyo (JP)

( * ) Notice: Subject to any disclaimer, the term of this patent is extended or adjusted under 35 U.S.C. 154(b) by 83 days.

(21) Appl. No.: 10/377,594

(22) Filed: Feb. 28, 2003

(65) Prior Publication Data
US 2003/0178239 A1 Sep. 25, 2003

(30) Foreign Application Priority Data
Mar. 1, 2002 (JP) .......................... 2002-056065

(51) Int. Cl.[7] ............................................. B60R 21/34
(52) U.S. Cl. .................... 180/274; 180/282; 280/730.1
(58) Field of Search ................................ 180/274, 282; 280/730.1, 728.1, 749

(56) References Cited

FOREIGN PATENT DOCUMENTS

| DE | 19745873 A1 | 4/1999 | | |
|---|---|---|---|---|
| DE | 199803165 A1 | 7/1999 | | |
| DE | 19935342 A1 | 2/2001 | | |
| DE | 10014832 A1 | 10/2001 | | |
| DE | 10014832 | 10/2001 | | |
| DE | 20119579 | 5/2002 | | |
| DE | 10059223 | * 7/2002 | ........... | B60R/21/34 |
| DE | 10059224 | * 7/2002 | ........... | B60R/21/34 |
| JP | 7-156749 | 6/1995 | | |
| JP | 2000264146 | 9/2000 | | |
| WO | WO 01/98119 A1 | 12/2001 | | |

* cited by examiner

Primary Examiner—Eric Culbreth
(74) Attorney, Agent, or Firm—Fitch, Even, Tabin & Flannery (57) ABSTRACT

An externally-developed airbag device is provided in which side bag members are expanded along pillars in expanding the airbag and in which even after the airbag has been fully expanded, the frontal view at the front side of the airbag from a driver seat is secured. The airbag can include a lower bag member that is expandable in the width direction (in the left-right direction) of a vehicle along a cowl top portion of the vehicle, left and right side bag members being expandable to be protruded in the upward direction along left and right pillars of the vehicle from both of the left and right ends of the lower bag member, and connecting members provided in an angle portion, in one form, between the respective side bag members and the lower bag member for connecting the side bag members and the lower bag member.

9 Claims, 12 Drawing Sheets

PRIOR ART

FIGURE 12

PRIOR ART

EXTERNALLY-DEVELOPED AIRBAG DEVICE

FIELD OF THE INVENTION

The present invention relates to an externally-developed airbag device for preventing a pedestrian or an occupant of a bicycle, a motorcycle and the like (hereinafter, referred to as a pedestrian and the like) from directly colliding with portions having a great rigidity such as pillar portions of a vehicle body to protect the pedestrian and the like when a traveling vehicle collides with a pedestrian, a bicycle, a motorcycle and the like.

BACKGROUND OF THE INVENTION

Typically, when a traveling vehicle collides with a pedestrian, a bicycle, or a motorcycle, the pedestrian and the like usually get struck in the lower half of their respective bodies by a front portion of the vehicle body, to be tossed onto a hood which covers the front upper portion of the vehicle body, and then may secondarily collide with portions having a great rigidity such as pillar portions.

Figure 11:
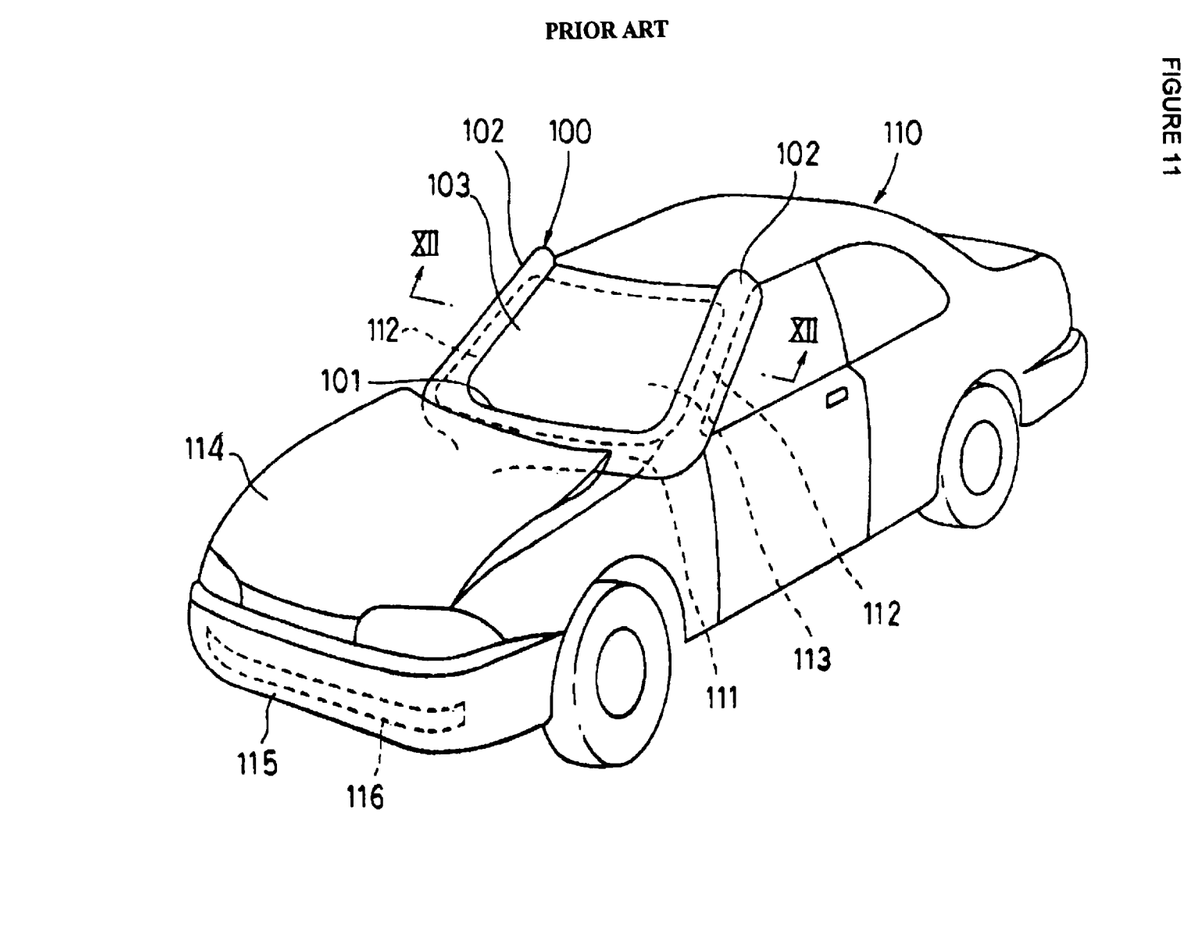
FIG. 11 is a perspective view of the vehicle illustrating the externally-developed airbag device according to a conventional example.
Figure 12:
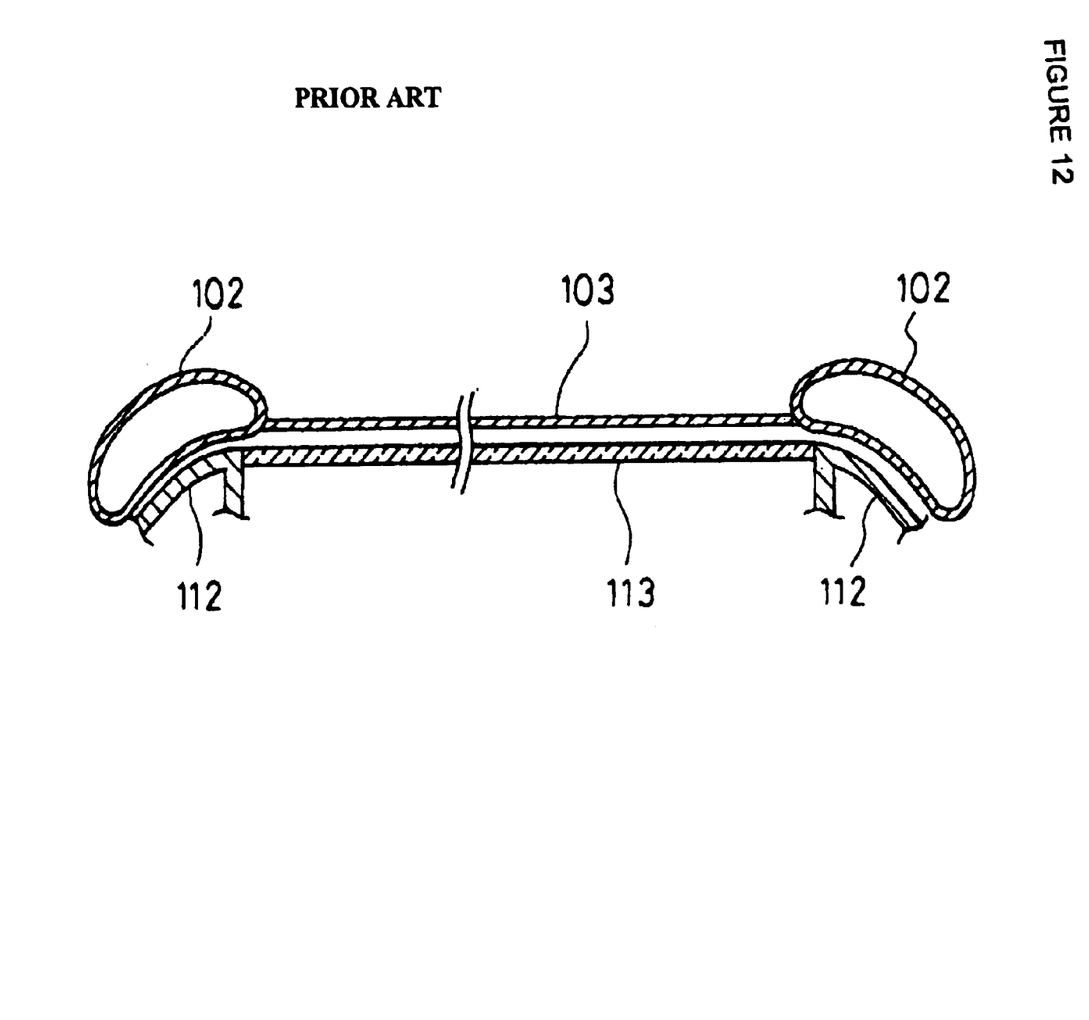
FIG. 12 is a sectional view taken along a line XII—XII in FIG. 11.

In Japanese Unexamined Application Publication No. 2000-264146, an externally-developed airbag device is disclosed for preventing a pedestrian and the like from directly colliding into A pillars by expanding an airbag along the left and right A pillars of the vehicle to protect the pedestrian and the like when the vehicle collides with the pedestrian and the like. Now, referring to FIGS. 11 and 12, this externally-developed airbag device will be explained. Further, FIG. 11 is a perspective view of a vehicle illustrating the airbag device for vehicle outer surface described by the above Publication, and FIG. 12 is a sectional view taken along a line XII—XII in FIG. 11.

The externally-developed airbag device described by the above Publication has an airbag 100 for being expanded along the vicinity of the circumferential edge portion of a windshield 113 of a vehicle 110.

The airbag 100 has a lower bag member 101 being expandable in the width direction (hereinafter, referred to as a left-right direction) of the vehicle body along a cowl top portion 111 and side bag members 102, 102 being expandable to be protruded in an upward direction along left and right A pillars 112, 112 of the vehicle 110 from both of the left and right ends of the lower bag member.

Between the side bag members 102, 102, a film 103 being unfoldable along the outer surface of the windshield 113 of the vehicle 110 in expanding the airbag 100 is provided.

In the inner space of the vehicle body on the rear-lower side of an engine hood 114 of the vehicle 110, a concave portion (not shown) for installing the airbag device is provided. The airbag 100 is normally received in the concave portion in its folded state, and is covered with the rear portion of the engine hood 114. In the concave portion, a gas generator (not shown) for inflating the airbag 100 is provided.

In a front bumper 115 of the vehicle 110, a sensor 116 for detecting a collision of the vehicle 110 with a pedestrian and the like is provided. If the sensor 116 detects the collision of the vehicle 110 with a pedestrian and the like, the gas generator starts by the detection signal to generate gas for inflating the airbag 100.

The airbag 100 starts expansion by means of gas from the gas generator and pushes up the rear portion of the engine hood 114 to be expanded toward outside of the vehicle body. Then, the lower bag member 101 is expanded in the width direction of the vehicle body along the cowl top portion 111, and in its left and right end sides the respective side bag members 102 are expanded in the upward direction along the respective left and right A pillars 112 to cover the A pillars 112.

Moreover, the film 103 is unfolded along the front surface of the windshield 113 in accordance with the expansion of the left and right side bag members 102, 102 to cover the windshield 113.

In this externally-developed airbag device, since the film 103 is unfolded to cover the whole windshield 113 when the airbag 100 is expanded, it is difficult for a driver of the vehicle 110 to visually detect the front side of the film 103. In the above Japanese Unexamined Patent Application Publication No. 2000-264146, it was attempted to secure the view of the driver by using a transparent material such as urethane in the film 103. However, different materials used for the airbag 100 and the film 103, respectively, increase the production cost while decreasing the manufacturing productivity. Further, if the film 103 is omitted, there is a possibility that the expanded side bag members 102 slip out to the sides of the vehicle.

SUMMARY OF THE INVENTION

It is therefore an object of the present invention to provide an externally-developed airbag device in which the side bag members are expanded along the A pillars in expanding the airbag, and in which even after the airbag has been expanded, the frontal view at the front side of the airbag from the driver seat is secured.

An externally-developed airbag device of the present invention is an airbag device having an airbag to be developed along an outer surface of a vehicle. The airbag comprises: a lower bag member being expandable in a width direction of a vehicle body along a cowl top portion; side bag members being expandable to be protruded in an upward direction along both A pillars from both ends of the lower bag member; and a connecting member for connecting the lower bag member and the side bag members and being arranged along a windshield when the airbag is expanded, wherein the connecting member is arranged in an angle portion between the side bag members and one side of the lower bag member.

In the externally-developed airbag device, the lower bag member and the side bag members are connected by the connecting member and thus the side bag members are securely expanded along the A pillars without slipping laterally from the A pillars. Further, since the connecting member is arranged only in the angle portion between the side bag members and the lower bag member, even after the airbag has been expanded, the frontal view at the front side of the airbag from the driver seat is secured.

In an aspect of the present invention, the connecting member is surrounded by an inner sheet facing the vehicle body and an outer sheet opposite to the inner sheet and has an expandable vacant room communicating with at least one of the lower bag member and the side bag members. The vacant room extends slantingly between upper portions of the side bag members and the lower bag member, and the sheets are coupled to each other on a corner side where the side bag members and the lower bag member meet rather than the side of the vacant room.

Since the connecting member is also expanded by means of gas, it also contributes to protect the pedestrian and the like. In this case, since the sheets are coupled to each other on the corner side rather than the side of the vacant room of the connecting member, the volume of the vacant room of the connecting member is small, and thus gas output from the gas generator can rapidly expand effectively rapidly.

In another aspect of the present invention, the connecting member has a belt or strap shape for connecting slantingly the upper portion of the side bag member and the lower bag member. According to this aspect, the construction is simple and the production cost can be lowered.

In a further aspect of the present invention, the connecting member has a triangular sheet shape connected to both of the side bag members and the lower bag member. According to this aspect, the construction is simple and the production cost can be lowered.

In this case, the connecting member having the triangular sheet shape may extend almost over the whole length of the lower bag member, and the corner side may be a corner portion on a passenger seat side of the vehicle. In this case, about a half of the windshield is covered with the sheet-shaped connecting member to reduce the possibility of the windshield coming in direct contact with a pedestrian and the like by half. Further, the connecting member minimally covers the front side of the driver seat to secure the frontal view from the driver seat.

An externally-developed airbag device of the present invention is an airbag device having an airbag to be developed along an outer surface of a vehicle. The airbag comprising: a lower bag member being expandable in a width direction of a vehicle body along a cowl top portion; side bag members being expandable to be protruded in an upward direction along both A pillars from both ends of the lower bag member; and a connecting member for connecting the lower bag member and the side bag members and being arranged along a windshield when the airbag is expanded, wherein the connecting member is provided between the side bag members on a left side and a right side of the vehicle, and the connecting member in front of a driver seat is provided with an opening for visually detecting a front side of the connecting member from the driver seat.

Since the connecting member is provided in the above externally-developed airbag device, the side bag members are securely expanded along the A pillars. Further, through the opening provided in the connecting member, the frontal view at the front side of the driver seat is secured.

DETAILED DESCRIPTION OF THE PREFERRED EMBODIMENTS

Figure 1:
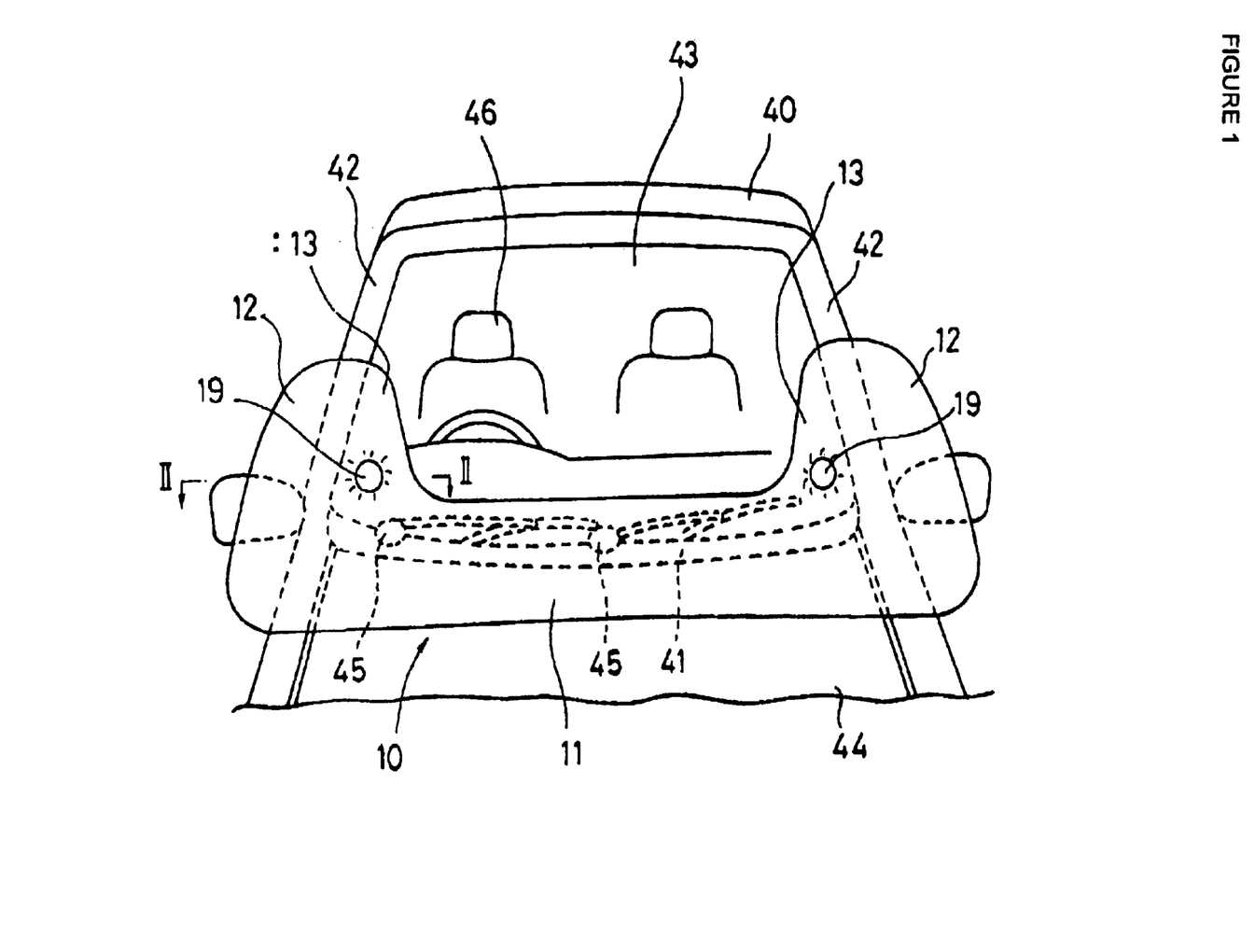
FIG. 1 is a front view of a vehicle illustrating an externally-developed airbag device according to an embodiment of the present invention.
Figure 2:
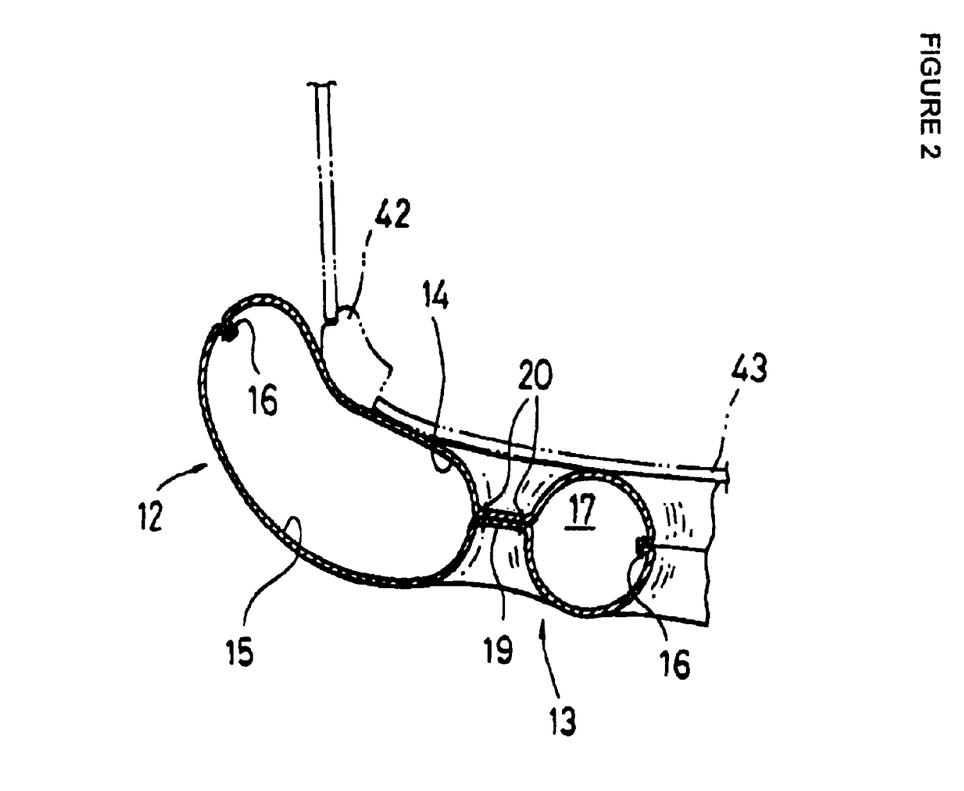
FIG. 2 is a sectional view taken along a line II—II in FIG. 1.

Now, referring to the drawings, preferred embodiments of the present invention will be explained. FIG. 1 is a front view of a vehicle illustrating the externally-developed airbag device according to a preferred embodiment of the present invention and FIG. 2 is a sectional view taken along a line II—II in FIG. 1.

As shown in FIG. 1, an airbag 10 of the externally-developed airbag device comprises a lower bag member 11 being expandable in a width direction of a vehicle body (in the left-right direction) along a cowl top portion 41 of a vehicle 40, left and right side bag members 12, 12 being expandable to be protruded in an upward direction along left and right A pillars 42, 42 of the vehicle 40 from both of left and right end sides of the lower bag member 11, and connecting members 13, 13 provided in an angle portion between the respective side bag members 12, 12 and the lower bag member 11 for connecting the side bag members 12, 12 and the lower bag member 11. In a state that the airbag 10 has been expanded, the respective connecting members 13 are arranged along the vicinity of the lower corner portions on the left and right sides of the windshield 43 of the vehicle 40.

The airbag 10 is constituted by two sheets of an inner sheet 14 facing the vehicle body and an outer sheet 15 opposite to the inner sheet 14, and circumferential edge portions thereof are coupled to each other through sewing and the like, such that the airbag 10 is expanded by means of introducing gas between both sheets. Although not shown, the inner sheet 14 of the lower bag member 11 is provided with a gas inlet for introducing gas to the airbag 10. Further, in FIG. 2, a reference numeral 16 indicates a seam between the circumferential edge portions of the inner sheet 14 and the outer sheet 15.

The respective connecting members 13 have an expandable vacant room 17 surrounded by the inner sheet 14 and the outer sheet 15. The vacant room 17 extends slantingly between the upper portion of the side bag member 12 and the lower bag member 11 to face the corner side between the side bag member 12 and the lower bag member 11. In this embodiment, both end sides of the vacant room 17 communicates with the side bag member 12 and the lower bag member 11, respectively.

On the corner side of the side bag member 12 and the lower bag member 11 rather than the side of the vacant room 17 of each connecting member 13, a sheet coupling portion 19 where the inner sheet 14 and the outer sheet 15 are coupled by means of sewing and the like is formed. A reference numeral 20 in FIG. 2 indicates a seam between the inner sheet 14 and the outer sheet 15 in the sheet coupling portion 19.

The sheet coupling portion 19 is provided at a position facing the windshield 43 when the airbag 10 has been expanded.

In the embodiment, the sheets 14, 15 are coupled along the annular seam 20, and thereby forming the circular sheet coupling portion 19 as shown in FIG. 1. In addition, the sheet coupling portion 19 may have a line shape or various polygonal shapes such as an elliptical shape or a triangular shape.

The airbag 10 is received in the concave portion (not shown) for installing the airbag device provided in the inner space of the vehicle body on a rear-lower side of an engine hood 44 of the vehicle while normally folded, and a rear portion of the engine hood 44 closes the upper side of the concave portion to cover the folded airbag 10. In the concave portion, a gas generator (not shown) for inflating the airbag 10 is provided.

In a front bumper (not shown) of the vehicle 40, a sensor (not shown) for detecting or sensing a collision of the vehicle 40 with a pedestrian and the like is provided. A control circuitry is formed to start the gas generator by means of a signal from the sensor.

Now, the operation of the externally-developed airbag device comprising the airbag 10 as described above will be explained.

When the vehicle collides and the gas generator starts, the airbag 10 starts expansion thereof by means of gas from the gas generator and pushes up the rear portion of the engine hood 44 to be expanded out of the vehicle body. Then, the lower bag member 11 is expanded in the width direction of the vehicle body along the cowl top portion 41 to cover the cowl top portion 41, a wiper pivot 45 provided to be protruded from the cowl top portion 41, and a rear-end corner edge portion of the engine hood 44 and the like. The respective side bag members 12 are expanded to be protruded in the upward direction along the left and right A pillars 42 from both end sides of the expanded lower bag member 11 to cover the respective A pillars 42.

The respective connecting members 13 are arranged along the windshield 43, and the vacant room 17 is expanded. As a result, the wobble of the respective side bag members 12 is prevented and the respective side bag members 12 are expanded to securely cover the respective A pillars 42. Further, even if a pedestrian and the like comes into collision with the respective side bag members 12, the respective side bag members 12 are supported by the connecting member 13 to stably receive the pedestrian and the like.

In the externally-developed airbag device, since the connecting members 13 are provided only in the angle portion between the lower bag member 11 and the side bag members 12 and the airbag 10 minimally covers the front side of the driver seat 46, the frontal view at the front side of the airbag 10 from the driver seat 46 is sufficiently visible even after the airbag 10 has been expanded.

Moreover, in this embodiment, the expanded connecting members 13 contribute to absorb the impact inflicted on the reception of the pedestrian and the like. Since the left and right corner sides of the connecting members 13 are coupled by the sheet coupling portion 19, the volume of the vacant room 17 is relatively small. For this reason, without increasing the output of the gas generator, the airbag 10 is rapidly expandable in an effective manner.

Figure 3:
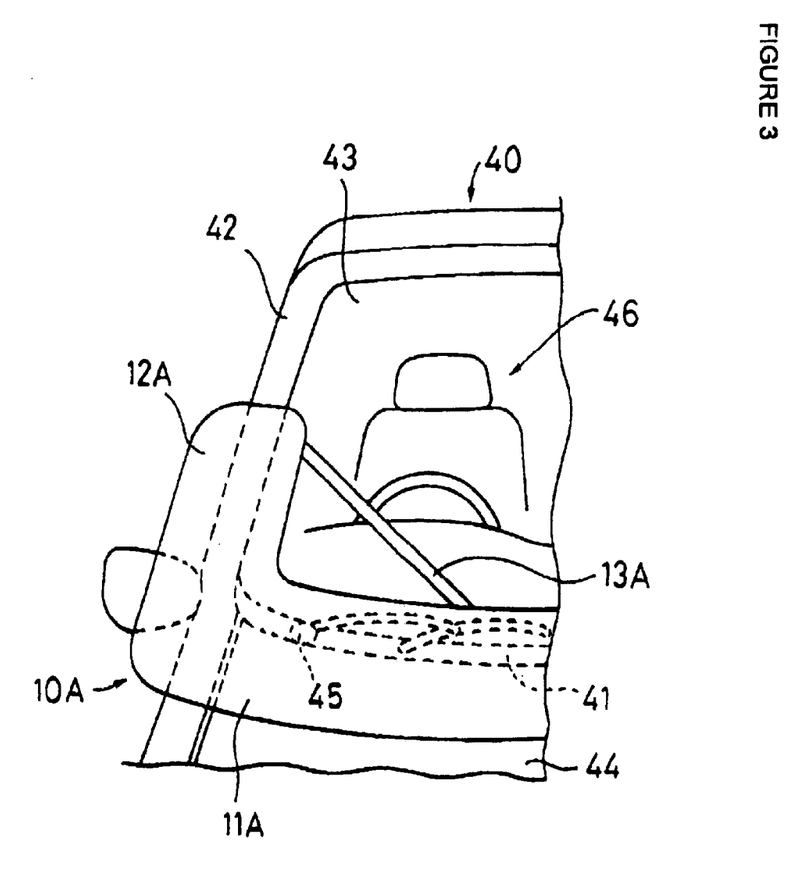
FIG. 3 is a front view of a driver seat side of the vehicle illustrating the externally-developed airbag device according to an embodiment of the present invention.
Figure 4:
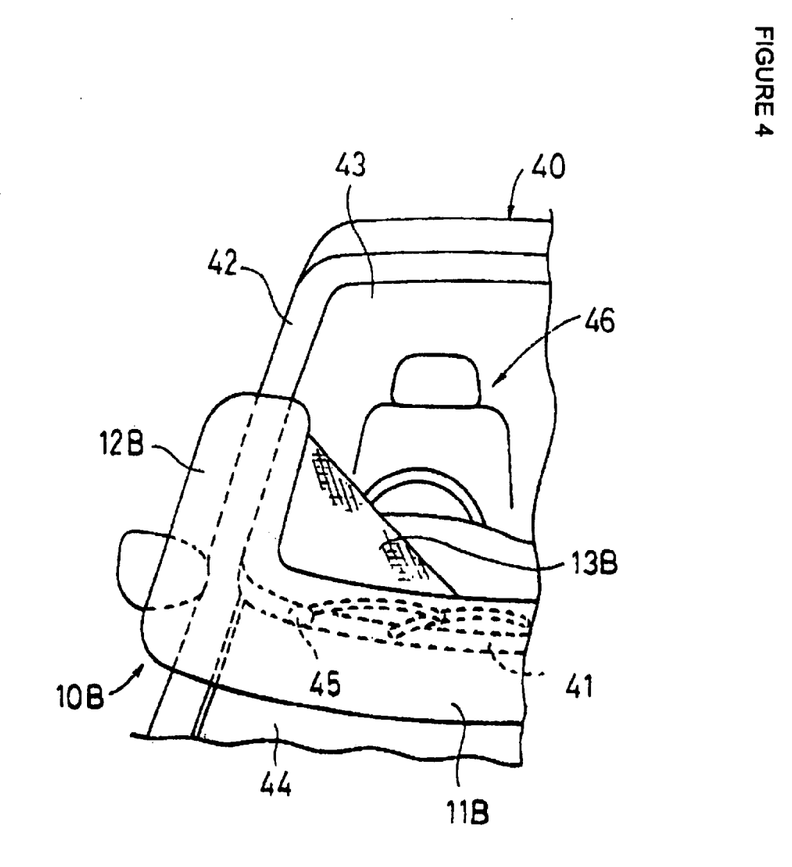
FIG. 4 is a front view of a driver seat side of the vehicle illustrating the externally-developed airbag device according to an embodiment of the present invention.
Figure 5:
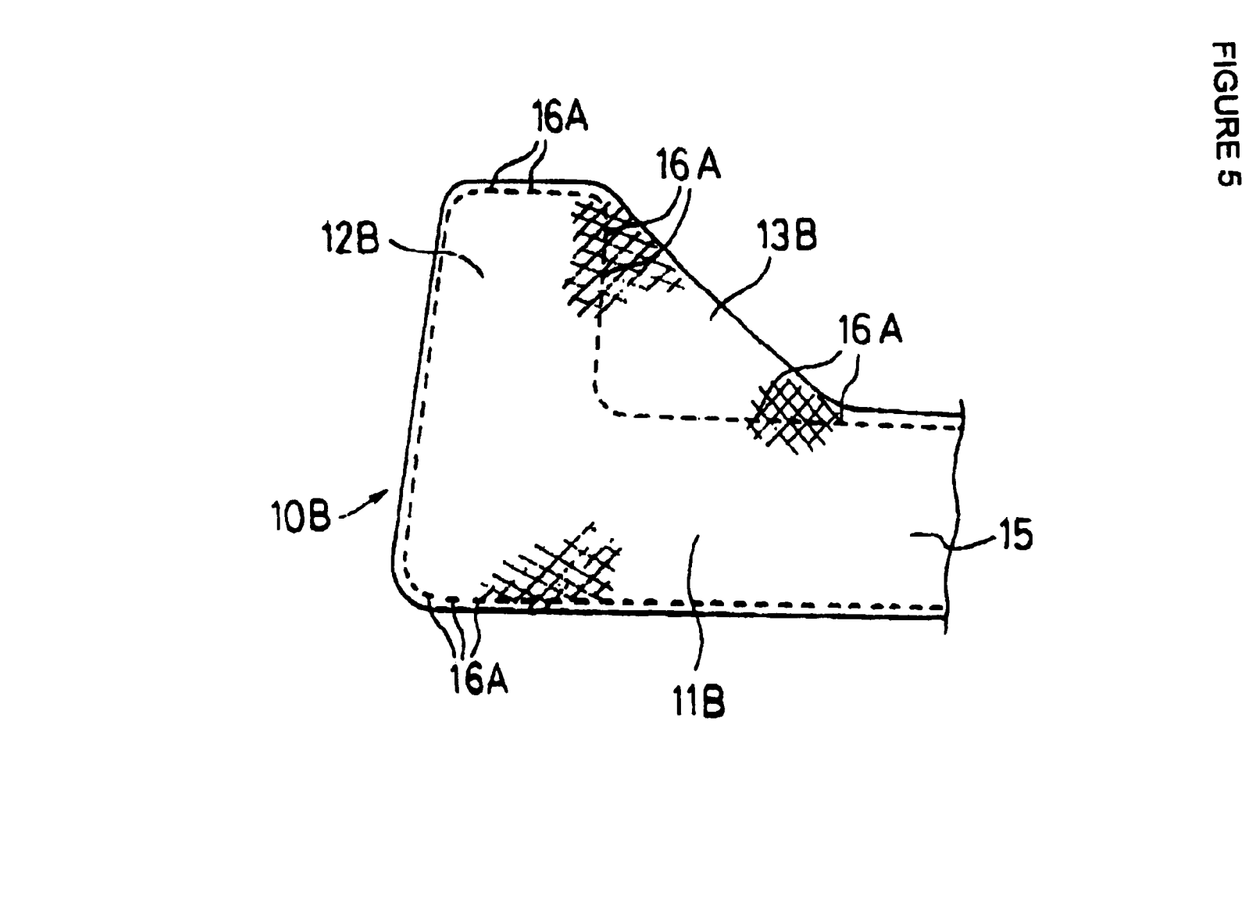
FIG. 5 is a plan view of an airbag 10B in FIG. 4 when it is unfolded flat.

FIGS. 3 and 4 are front views of the driver seat side of the vehicle illustrating the externally-developed airbag device according to another embodiment of the present invention, and FIG. 5 is a plan view of an airbag 10B in FIG. 4 when it is unfolded flat, respectively.

Airbags 10A, 10B of the airbag device for vehicle outer surface have lower bag members 11A, 11B being expandable in the width direction of the vehicle body along the cowl top portion 41 of the vehicle 40 and side bag members 12A, 12B being expandable to be protruded in the upward direction along the respective A pillars 42 from both of the left and right end sides of the lower bag members 11A, 11B.

In the airbag 10A in FIG. 3, the lower bag member 11A and an upper portion of the side bag member 12A are connected to each other slantingly through the connecting member 13A having a belt shape.

In the airbag 10B in FIG. 4, the lower bag member 11B and the side bag member 12B are connected to each other through a connecting member 13B having a triangular sheet shape. Further, in FIG. 5, the connecting member 13B is constructed by spreading out one or both of the outer sheet 15 and the inner sheet 14 constituting the airbag. A reference numeral 16A in FIG. 5 indicates a seam for coupling the sheets 14, 15.

In the airbags 10A, 10B in FIGS. 3 to 5, when the airbags 10A, 10B are expanded, the respective side bag members 12A, 12B are detained by the connecting members 13A, 13B and thus are expanded to securely cover the A pillars 42 without slipping laterally from the A pillars 42. Thus, the frontal view at the front of the driver seat is sufficiently visible.

Moreover, although there has been described in the embodiment of FIG. 3 that the connecting member 13A is fabricated from a belt-shaped material, it may however be fabricated from a strap-shaped material.

Figure 6:
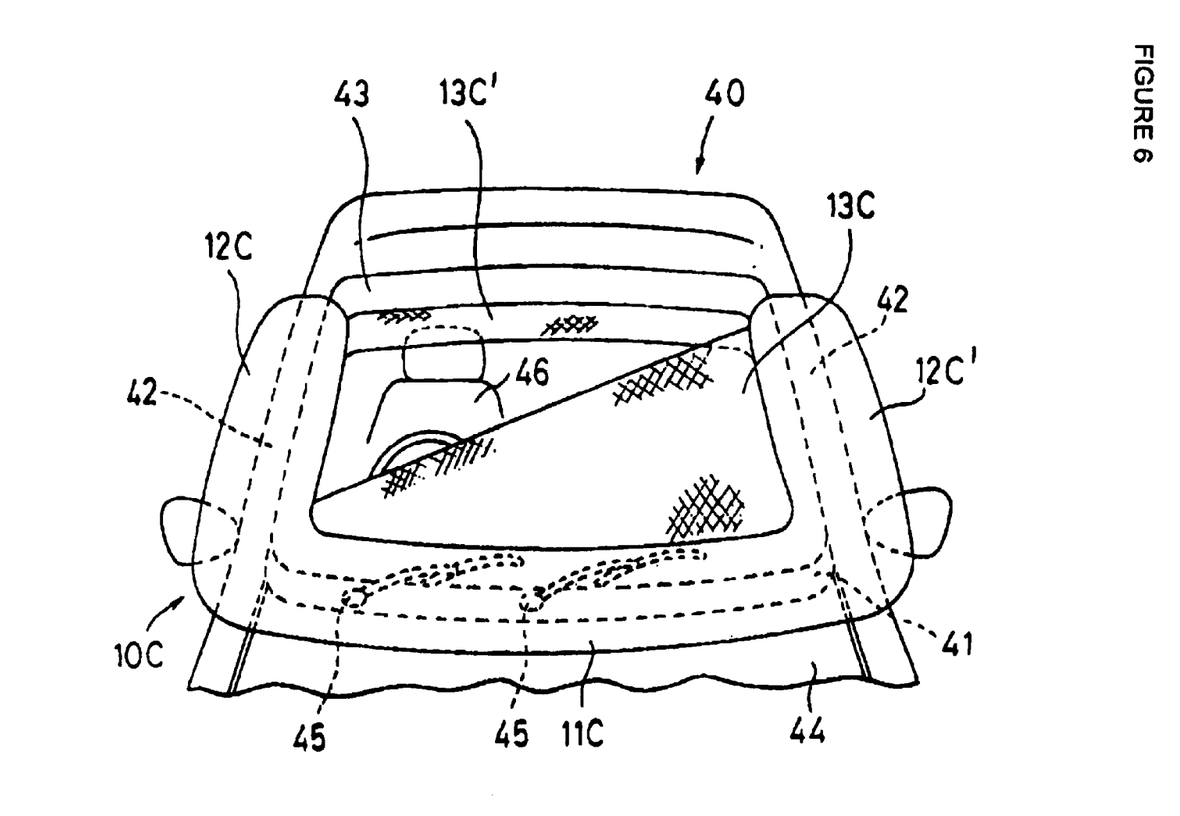
FIG. 6 is a front view of the vehicle illustrating the externally-developed airbag device according to an embodiment of the present invention.

FIG. 6 is a front view of a windshield portion of a vehicle illustrating an airbag device for vehicle outer surface having another construction.

An airbag 10C of the externally-developed airbag device has a lower bag member 11C being expandable in the width direction of the vehicle body along the cowl top portion 41 of the vehicle 40 and side bag members 12C, 12C' being expandable to be protruded in the upward direction along the respective A pillars 42 from both of the left and right end sides of the lower bag member 11C.

In this embodiment, in a triangular area defined between almost the whole portion of the side bag member 12C' on the passenger seat side and almost the whole portion of the lower bag member 11C, a sheet-shaped connecting member 13C is provided. The connecting member 13C having the triangular sheet shape extends over almost the whole lengths of the upper edge portion of the lower bag member 11C and the side bag member 12C' on the passenger seat side.

Moreover, in this embodiment, between the upper portion of the side bag member 12C' on the passenger seat side and the upper portion of the side bag member 12C on the driver seat 46 side, a second connecting member 13C' having a belt shape or a strap shape is provided. The connecting member 13C' is arranged along the upper edge portion of the windshield 43 in a state that the airbag 10C is expanded.

In the externally-developed airbag device comprising the airbag 10C as described above, if the airbag 10C is expanded, the side bag member 12C' on the passenger seat side is detained by the connecting member 13C and thus the side bag member 12C' is expanded to securely cover the A pillar 42 without slipping laterally from the A pillar 42. Further, the side bag member 12C on the driver seat 46 side is detained by the side bag member 12C' via the connecting member 13C' and thus is securely expanded along the A pillar 42 without slipping laterally from the A pillar 42, thereby to prevent a pedestrian and the like from colliding with the A pillar 42.

Further, in the externally-developed airbag device, the connecting member 13C unfolds vastly along the front surface of the windshield 43. However, since the connecting member 13C is arranged on the lower side of a diagonal line connecting the upper corner on the passenger seat side to the lower corner on the driver seat side in the windshield 43, even after the airbag 10C has been expanded, the view from the driver seat 46 is secured. Moreover, in this embodiment, since the connecting member 13C covers about a half of the windshield 43, the possibility of a pedestrian and the like coming in direct contact with the windshield 43 is decreased by half.

Figure 7:
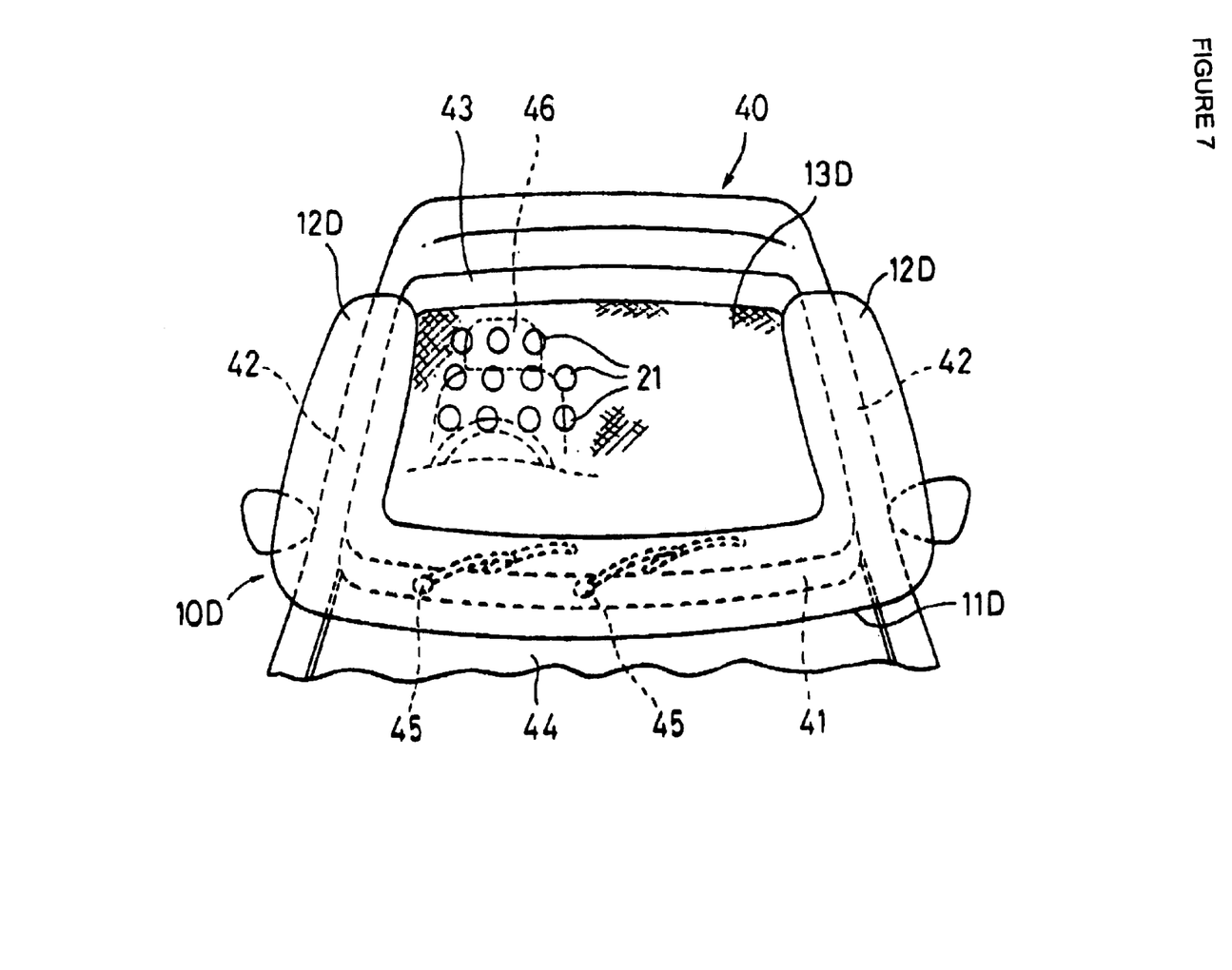
FIG. 7 is a front view of the vehicle illustrating the externally-developed airbag device according to an embodiment of the present invention.

FIG. 7 is a front view illustrating an externally-developed airbag device according to an embodiment of the present invention.

In an airbag 10D of the externally-developed airbag device, between both side bag members 12D, 12D being expandable in the upward direction along the A pillars 42 from both of the left and right end sides of a lower bag member 11D being expandable along the cowl top portion 41 of the vehicle 40, a connecting member 13D having a sheet shape is provided. The lower edge portion of the connecting member 13D is connected to the upper edge portion of the lower bag member 11D. The connecting member 13D is unfolded along the front surface of the windshield 43 when the airbag 10D is expanded, and has a size enough to cover almost the whole surface of the windshield 43.

The connecting member 13D has a plurality of small circular openings 21 for visually seeing through the front side of the connecting member 13D from the driver seat 46, in an area overlapping the windshield 43 in front of the driver seat 46 when the airbag 10D is expanded.

In the externally-developed airbag device comprising the airbag 10D as described above, when the airbag 10D is expanded, the left and right side bag members 12D, 12D retain each other via the connecting member 13D and thus are securely expanded in the upward direction along the A pillars 42 without slipping laterally from the A pillars 42. Although the connecting member 13D is unfolded along almost the whole front surface of the windshield 43 due to the expansion of the side bag members 12D, the front side of the connecting member 13D can be visually detected through the openings 21 from the driver seat 46.

In the embodiment in FIG. 7, a plurality of small circular openings 21 are provided in the connecting member 13D in front of the driver seat 46 so as to visually detect the front side of the connecting member 13D from the driver seat 46 in a state when the airbag 10D is expanded. However, construction of the openings is not limited to the construction shown in FIG. 7 and may have various opening shapes. The size or number thereof may be selected properly.

Figure 8:
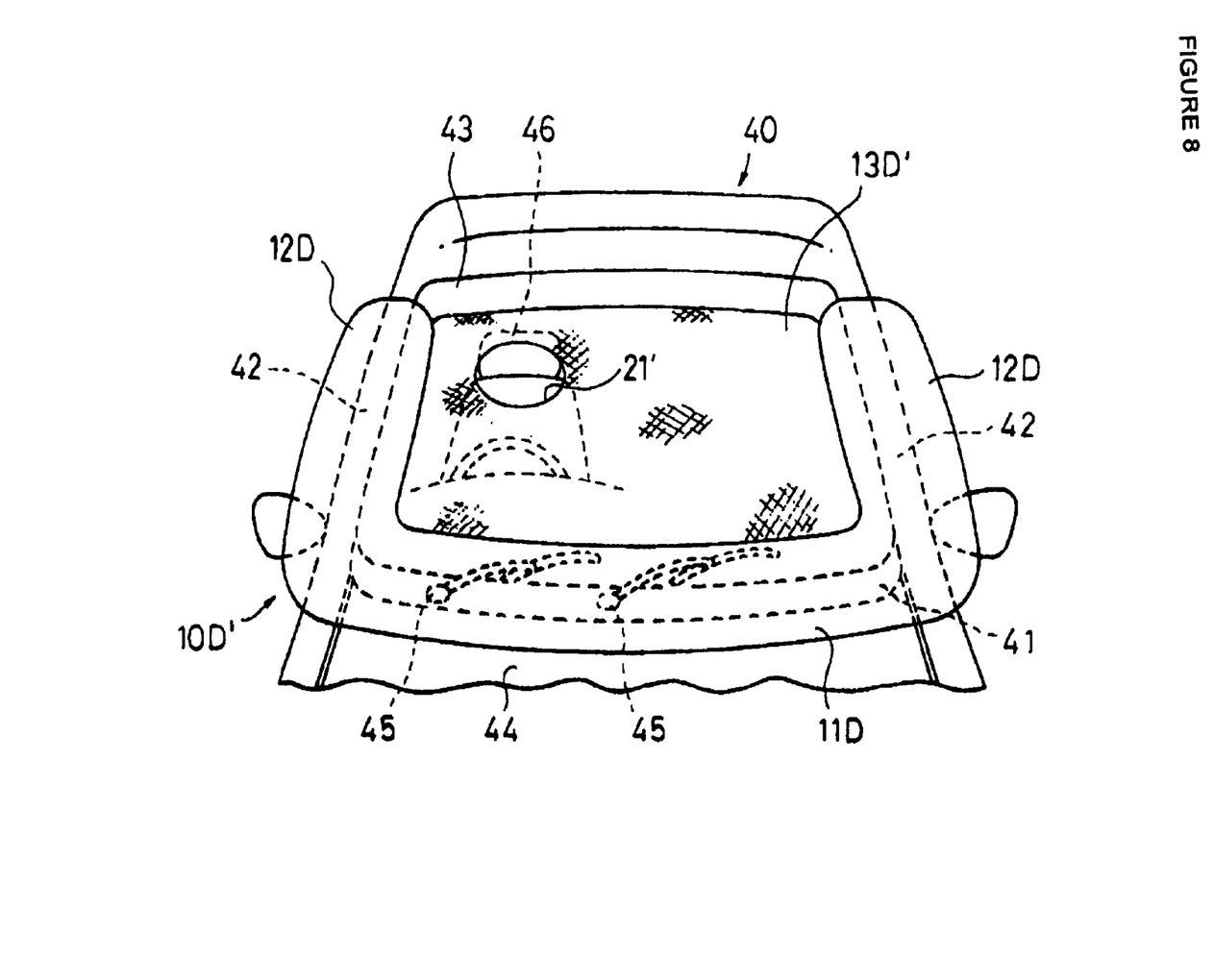
FIG. 8 is a front view of the vehicle illustrating the externally-developed airbag device according to an embodiment of the present invention.

For example, as in the airbag 10D' in FIG. 8, a circular opening 21' having a large width may be provided in a connecting member 13D' in front of the driver seat 46. The other constructional features of the airbag 10D' is the same as that of the airbag 10D in FIG. 7.

Figure 9:
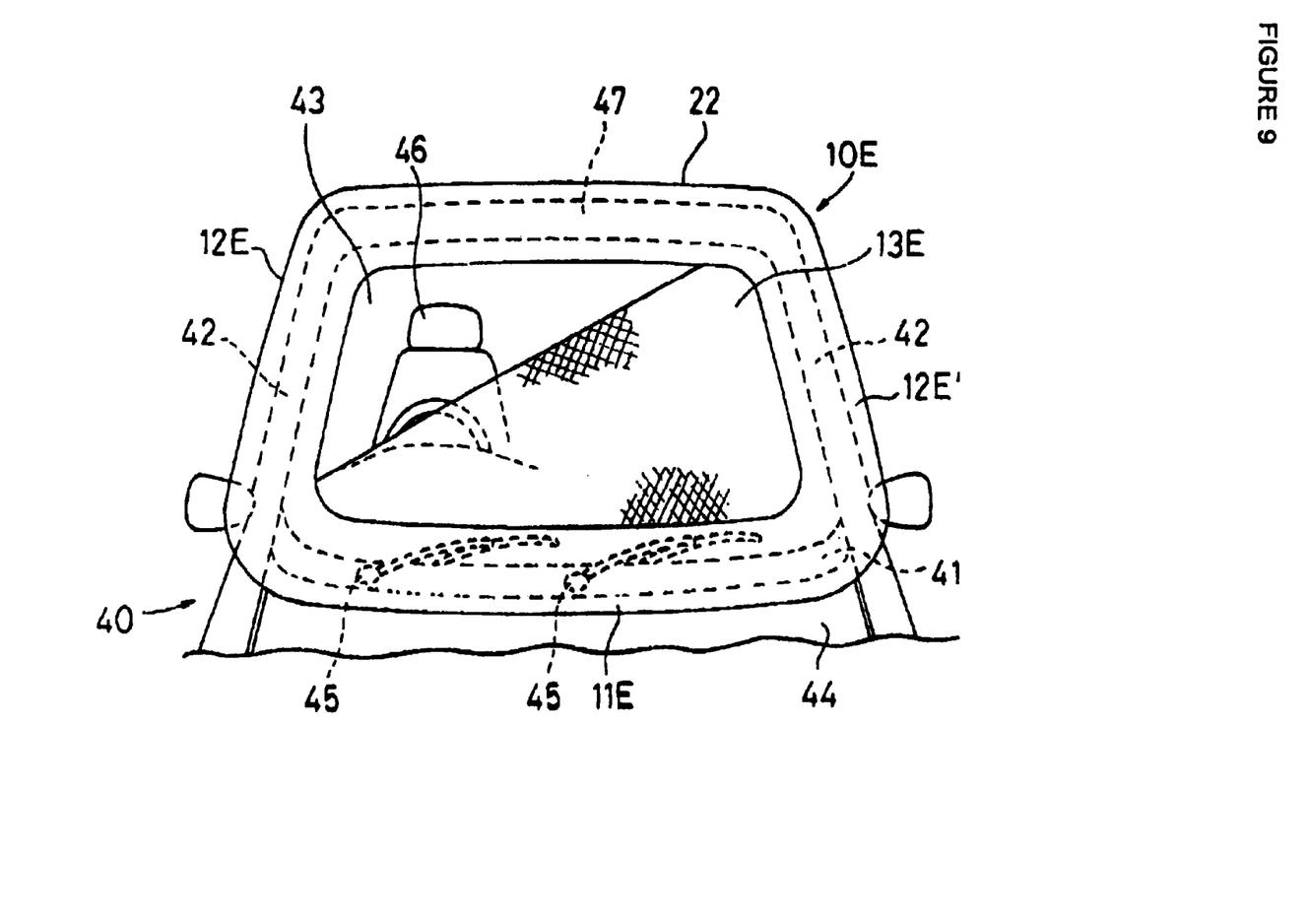
FIG. 9 is a front view of the vehicle illustrating the externally-developed airbag device according to an embodiment of the present invention.
Figure 10:
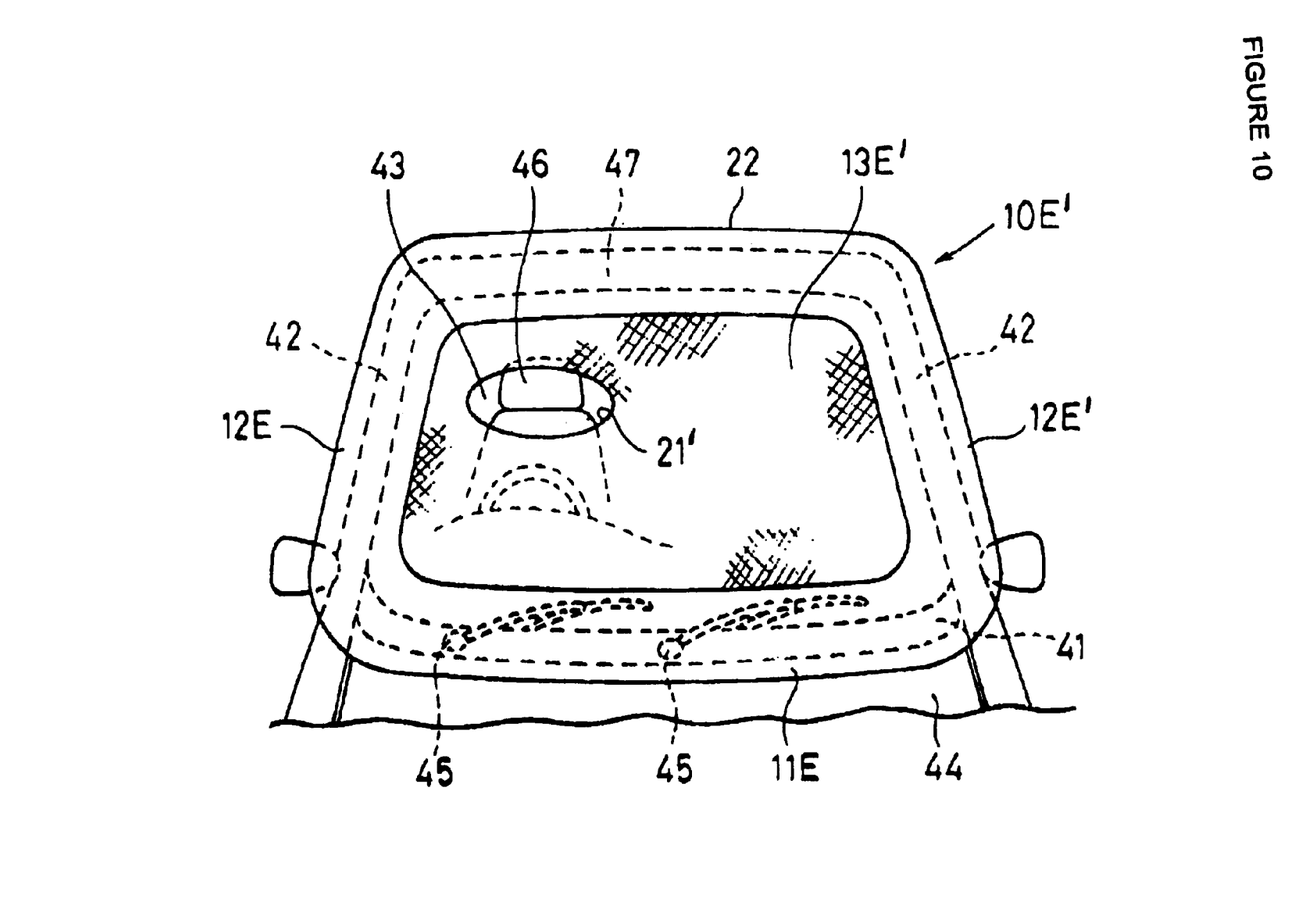
FIG. 10 is a front view of the vehicle illustrating the externally-developed airbag device according to an embodiment of the present invention.

The above externally-developed airbag device comprise the airbags 10, 10A to 10D (10D') having an "U" shapes of which the upper side is opened and having the lower bag member being expandable along the cowl top portion of the vehicle and both of the left and right side bag members being expandable to be protruded in the upward direction along the A pillars from both end sides of the lower bag member, respectively. However, the externally-developed airbag device of the present invention may comprise the airbag of a substantially rectangular shape having an upper bag member being expandable along the front edge portion of a roof of the vehicle. FIGS. 9 and 10 are front views of the vicinity of a windshield having constructed with the airbags 10E, 10E', respectively.

The airbag 10E in FIG. 9 has a lower bag member 11E being expandable in the width direction of the vehicle body along the cowl top portion 41 of the vehicle 40, side bag members 12E, 12E' being expandable in the upward direction along the left and right A pillars 42 from both end sides of the lower bag member 11E, and an upper bag member 22 being expandable in the width direction of the vehicle body along the front edge portion of a roof 47 of the vehicle 40 and provided between the upper ends of both side bag members 12E, 12E'. Here, the side bag member 12E' on the passenger seat side and the lower bag member 11E are connected through a connecting member 13E of a triangular sheet shape having the same construction as the connecting member 13C in FIG. 6.

In the airbag 10E' in FIG. 10, in place of the connecting member 13E, a connecting member 13E' having the same construction as the connecting member 13D' in FIG. 8, that is, having an opening 21' which allows visibility from the driver seat 46 is provided between both side bag members 12E, 12E'.

The other constructional features of this airbag 10E' is the same as the airbag 10E in FIG. 9.

Although not shown, a plurality of openings 21 in FIG. 7 may be substituted for the opening 21' of the connecting member 13E' in FIG. 10.

As described above, according to the present invention, an externally-developed airbag device in which the side bag members are expanded along the A pillars in expanding the airbag, and in which even after the airbag has been fully expanded, the frontal view at the front side of the airbag from the driver seat can be visible is provided.

What is claimed is:

1. An external airbag for an automobile including a windshield extending between a pair of pillars of the automobile, the external airbag comprising:
    a lower bag portion for being deployed across a lower area of the windshield;
    side bag portions for being deployed along the automobile pillars; and
    at least one connector portion extending between the lower bag portion and at least one of the side bag portions for keeping the lower bag portion and side bag portions in a predetermined deployed orientation relative to each other with the side bag portions covering the pillars and so that the connector portion does not cover a viewing area of the windshield generally forwardly of a driver of the automobile with the bag portions deployed.

2. The external airbag of claim 1 wherein the lower bag portion includes opposite lateral end portions and the side bag portions include lower end portions with the at least one connector portion comprising a pair of connector portions configured to extend between the lateral end portions of the lower bag portion and the lower end portions of the side bag portions.

3. The external airbag of claim 1 wherein the at least one connector portion includes airbag material that is inflated with deployment of the lower and side bag portions.

4. The external airbag of claim 2 wherein the connector portions have a triangular sheet shaped configuration.

5. The external airbag of claim 2 wherein the connector portions have a belt or strapped shaped configuration.

6. The external airbag of claim 1 wherein the one side bag portion has an upper end portion and the one connector portion extends from the upper end portion downwardly and across the windshield for substantially the full extent of the lower bag portion.

7. The external airbag of claim 6 including another connector portion extending from the upper end portion of the one side bag portion across the windshield and spaced above the one connector portion to the other side bag portion.

8. The external airbag of claim 1 wherein the one connector portion extends between the side bag portions and along the lower bag portion, and a window opening of the one connector portion disposed in the viewing area of the windshield generally forwardly of the driver to allow the driver to see through the connector portion.

9. The external airbag of claim 1 wherein the one connector portion extends between the side bag portions and along the lower bag portion, and a plurality of small openings of the one connector portion disposed in the viewing area of the windshield generally forwardly of the driver to allow the driver to see through the connector portion.

* * * * *